United States Patent [19]
Aoki et al.

[11] Patent Number: 5,955,664
[45] Date of Patent: Sep. 21, 1999

[54] DEVICE FOR DETECTING A STATE OF COMBUSTION IN AN INTERNAL COMBUSTION ENGINE

[75] Inventors: Keiichiro Aoki, Susono; Yoichi Kurebayashi, Toyohashi, both of Japan

[73] Assignee: Toyota Jidosha Kabushiki Kaisha, Aichi-Ken, Japan

[21] Appl. No.: 08/923,163

[22] Filed: Sep. 4, 1997

[30] Foreign Application Priority Data

Sep. 5, 1996 [JP] Japan ................................. 8-235128

[51] Int. Cl.$^6$ ................................. G01M 15/00
[52] U.S. Cl. ........................... 73/117.3; 73/35.08
[58] Field of Search .................... 73/117.3, 116, 73/35.08, 35.03, 35.04, 35.05, 35.06, 35.07, 35.01; 324/378, 399; 123/425, 426, 427; 701/99, 101, 102, 111

[56] References Cited

U.S. PATENT DOCUMENTS

| | | | |
|---|---|---|---|
| 5,146,893 | 9/1992 | Ohsawa | 123/425 |
| 5,222,393 | 6/1993 | Ohsawa | 73/117.3 |
| 5,563,332 | 10/1996 | Yasuda | 73/35.08 |

FOREIGN PATENT DOCUMENTS 587536    1/1993    Japan.

*Primary Examiner*—Hezron Williams
*Assistant Examiner*—Richard A. Moller
*Attorney, Agent, or Firm*—Kenyon & Kenyon

[57] ABSTRACT

A device for a detecting a combustion state in an internal combustion engine, capable of preventing the background from increasing while the fuel is being cut. A peak value of ionic current detected by the ionic current detecting unit 19 is supplied to an ignition timing control unit 14 via an LC resonance masking unit 31, a band-pass filter unit 32 and a peak-holding unit 33. An average of peak values is used as a background, and it is so determined that knocking has occurred when the peak value becomes larger than the product of a predetermined coefficient and the background (BG). Impulse noise (IM) easily occurs while the fuel is being cut. In order to prevent BG from being increased by IM, therefore, a limiting means is provided to limit BG to a value calculated before the fuel was cut, so that the detecting precision will not be deteriorated after the fuel-cut is terminated.

13 Claims, 15 Drawing Sheets

DEVICE FOR DETECTING A STATE OF COMBUSTION IN AN INTERNAL COMBUSTION ENGINE

BACKGROUND OF THE INVENTION

1. Field of the Invention

The present invention relates to a device for detecting the combusting state of an internal combustion engine and, particularly, to a device for detecting combusting conditions in an internal combustion engine, capable of suppressing a reduction in the precision of detection after fuel has been cut.

2. Prior Art

In an internal combustion engine using gasoline as fuel, a gas mixture compressed by a piston is ignited by a spark plug and is burned to produce an output. That is, in normal combustion, a flame nucleus of a gas mixture is formed near the spark plug, and propagates throughout the whole combustion chamber.

The ignition timing of the spark plug has a close relationship to the output of the internal combustion engine. When the ignition timing is late, the speed of propagation of the flame becomes slow. Therefore, the combustion becomes slow resulting in a decrease in the combustion efficiency and, hence, in a decrease in the output of the internal combustion engine.

When the ignition timing is early, on the other hand, the propagation of flame becomes fast, whereby the maximum pressure of combustion increases and the output of the internal combustion engine increases. When the ignition timing is too early, however, there takes place knocking in which the gas mixture is self-ignited prior to the propagation of the flame, often damaging the internal combustion engine.

That is, it is advantageous to operate the internal combustion engine in a region in which the ignition timing is set to just before the occurrence of knocking (MBT: Minimum spark advance for Best Torque) from the standpoint of fuel efficiency and output. It is quite important to reliably detect the occurrence of knocking.

When misfiring occurs without the gas mixture being ignited by the spark plug, unburned mixture gas is exhausted into an exhaust pipe. When the mixture gas burns in the exhaust pipe or in a catalyst for purifying exhaust gases, the exhaust pipe and/or the catalyst may be damaged. Therefore, it is also important to detect misfiring.

A knock sensor which is a vibration sensor has heretofore been used for detecting knocking. However, a device which detects at least one of knocking and misfire by utilizing a phenomenon that ions are generated in the combustion chamber due to the combustion of the mixture gas and an ionic current flows, has been proposed.

FIG. 1 is a diagram schematically illustrating an ignition circuit for an internal combustion engine, wherein an end of a primary coil 111 of an ignition coil 11 is connected to the positive electrode of a battery 12. The other end is grounded via the collector and the emitter of a switching transistor 13 installed in an igniter.

The base of the transistor 13 is connected to an ignition timing control unit 14, so that the transistor 13 is turned on when an ignition signal IGT is output from the ignition timing control unit 14.

An end of a secondary coil 112 of the ignition coil 11 is also connected to the positive electrode of the battery 12, and the other end is connected to a spark plug 8 through a reverse current-preventing diode 15, a distributor 16 and a high-tension cable 17.

An ionic current detecting unit 19 is connected to the output of the distributor 16 in parallel with the spark plug 18.

An ionic current flows, through a protection diode 191, to a series circuit of a current-voltage conversion resistor 192 and a bias power source 193. A voltage, generated at a point where the current-voltage conversion resistor 192 and the protection diode 191 are connected together, is applied to an amplifying circuit 195 constituted by an operational amplifier and resistors through a cutting DC capacitor 194.

Therefore, a voltage signal proportional to the AC component of the ionic current is output at an output terminal 196 of the ionic current detecting unit 19.

FIG. 2A to 2E are diagrams of voltage waveforms at each of the portions of the ignition circuit (FIG. 1), and show, respectively, an ignition signal IGT, a voltage at the grounding side of the primary coil (P-point), a voltage on the high-voltage side of the secondary coil (S-point), and an input voltage to the amplifier circuit (I-point). All abscissas represent the time.

When the ignition signal IGT becomes an "H" level at a moment $t_1$ and the transistor 13 is turned on, the voltage at the P-point, that is, the grounding side of the primary coil 111 of the ignition coil 11 drops. Immediately after the moment $t_1$, a negative high-voltage pulse is generated at the S-point, that is, the high-voltage side of the secondary coil. In this case, the current is blocked by the reverse current-preventing diode 15 from flowing into the spark plug 18 and the ionic current detecting unit 19.

When the ignition signal IGT becomes an "L" level at a moment $t_2$ and the transistor 13 is cut off, a voltage abruptly rises at the P-point, and a positive high-voltage pulse is generated at the S-point.

The positive high-voltage pulse is not blocked by the reverse current-preventing diode 15 and flows into the spark plug 18 and is discharged, but is prevented by the protection diode 191 from flowing into the ionic current detecting unit 19.

Furthermore, from a moment $t_3$ to a moment $t_4$ after the discharge of the spark plug 18, LC resonance is triggered by energy remaining in the ignition coil 11 due to parasitic inductance and parasitic capacitance of a high-tension cable 17 and the like.

The gas mixture in the cylinder is ignited by the discharge of the spark plug 18, ions are generated in the cylinder as the flame spreads, and an ionic current starts flowing. The ionic current increases with a rise of the pressure in the cylinder and decreases with a drop of the pressure in the cylinder.

When knocking occurs in the internal combustion engine, knocking signals with a particular frequency (6 to 7 KHz) are superposed while the ionic current is decreasing after having reached a peak.

In order to detect knocking using the ionic current, therefore, it is desired to detect only the knocking signals with the particular frequency and remove other signals (e.g., LC resonance). For this purpose, therefore, it is desired to provide a knocking window which opens at a moment $t_5$ after there are no other signals and closes at a suitable moment (e.g., ATDC 60°) after the ionic current has disappeared, in order to detect knocking based upon the output of the ionic current detecting unit 19 while the knocking window is opened.

When the misfire occurs, furthermore, no ionic current flows, and it is possible to detect the misfire depending upon whether or not the ionic current is generated while the knocking window is opened.

FIG. 3 is a diagram illustrating the constitution of a device for detecting combusting conditions, which detects knocking using the ionic current. The output of the amplifying circuit 19S in the ionic current detecting unit 19 is supplied to a processing unit 34 through an LC resonance masking unit 31, a band-pass filter (BPF) unit 32 and an integrating (or peak-holding) unit 33.

The LC resonance masking unit 31 is closed after the start of discharge of the secondary coil 112 of the ignition coil 11 and is opened at a suitable timing after the ionic current has disappeared. Furthermore, the integrating (or peak-holding) unit 33 is opened after a predetermined period determined depending upon the engine speed and the load, and is closed after a time corresponding to about 50° CA converted into the crank angle.

"A method of detecting knocking of an internal combustion engine" has been proposed already (Japanese Unexamined Patent Publication (Kokai) No. 58-7536). In this method knocking signals are separated by the BPF unit 32 from the ionic current that is received by the ionic current detector 19 after the LC resonance masking unit 31 is opened, a peak of the knocking signals is detected, and this peak value is compared with an upper limit value and a lower limit value (reference values) determined depending upon the engine speed to detect knocking.

However, a reference value depends not only upon the engine speed but also upon the output of the ionic current detecting unit at a state where no knocking is occurring. It has, therefore, been suggested to store, as a background, a moving average of the outputs of the ionic current detecting unit and to correct the reference value based on the background.

The ionic current detecting unit 19, however, detects a very small ionic current and must have a high input impedance and a high gain, and is inevitably susceptible to being affected by noise due to corona discharge of the spark plug 18. In particular, in the fuel-cut state where the throttle valve is fully closed (e.g., while running downhill), spike noise is easily generated and is superposed on the ionic current detecting unit 19.

FIG. 4A–4D are diagrams illustrating the effect of spike noise, and show, respectively outputs of the ionic current detecting unit, the BPF unit, the knocking window and the peak holder output. All abscissas represent time.

That is, at a moment $t_{23}$ between a moment $t_2$ and a moment $t_3$, the LC resonance masking unit 31 is opened, and the output of the ionic current detecting unit 19 is supplied to the BPF unit 32. The knocking window is opened from a moment $t_5$ to a moment $t_6$.

Though the spike noise generated before the moment $t_5$ does not affect the peak-holding unit 33, it has a wide frequency spectral width and cannot be removed by the BPF unit. Therefore, the output of the peak-holding unit 33 increases due to the spike noise generated between the moment $t_5$ and the moment $t_6$.

When the fuel is cut, therefore, the background inevitably increases due to the noise though knocking does not occur.

Once the learned value increases, detection of knocking is delayed when the knocking is likely to occur (e.g., while the uphill running) after the fuel is no longer being cut, and the internal combustion engine is more likely to be damaged. When the background is increased, furthermore, the precision for detecting misfire is deteriorated.

The present invention is accomplished in view of the above-mentioned problems, and provides a device for detecting the state of combustion in an internal combustion engine, which is capable of preventing an increase in background signal while the fuel is being cut.

SUMMARY OF THE INVENTION

A device for detecting combusting state in an internal combustion engine according to a first invention comprises:
- an ionic current detection means which applies a voltage across a pair of electrodes installed in a combustion chamber of the internal combustion engine, and detects the ionic current flowing between the pair of electrodes through ions generated when the gas mixture in the combustion chamber burns;
- a background calculating means for calculating a background based upon the ionic current detected by said ionic current detection means;
- a combusting state detecting means for detecting the combusting state in the cylinder of the internal combustion engine by comparing a signal level of the ionic current detected by said ionic current detecting means with a reference value determined based upon the background calculated by said background calculating means; and
- a limiting means for, when the fuel for the internal combustion engine is being cut, limiting the background calculated by said background calculating means to that calculated before the fuel has been cut.

According to this device, the background level is not raised by noise while the fuel is being cut and, hence, the detecting precision of detection is not deteriorated after a return from the fuel cut.

In a device for detecting combusting condition in an internal combustion engine according a second invention, the limiting means sets the background calculated by the background calculating means while the fuel is being cut to a fixed value.

According to this device, the background is not updated while the fuel is being cut and it is set to a fixed value.

In the device for detecting combusting state of an internal combustion engine according to a third invention, the limiting means prevents the calculation of background by the background calculating means while the fuel is being cut.

According to this device, the background is not updated when the fuel is being cut, and the background level is maintained at a value calculated before the fuel is cut.

In the device for detecting the state of combustion in an internal combustion engine according to a fourth invention, the limiting means is inhibited from outputting ignition signals from the ignition timing control unit while the fuel is being cut.

In this device, a spark command signal which causes noise is not output when the fuel is being cut. While the fuel is being cut, therefore, the background level is updated but is limited a value smaller than the value calculated before the fuel is cut.

In the device for detecting combusting condition of an internal combustion engine according to a fifth invention, the limiting means is inhibited from detecting the ionic current by the ionic current detecting means while the fuel is being cut.

In the device of this invention, the ionic current is not detected while the fuel is being cut. While the fuel is being cut, therefore, the background level is updated but is limited to smaller than the value calculated before the fuel is cut.

DETAILED DESCRIPTION OF THE PREFERRED EMBODIMENTS

Figure 5:
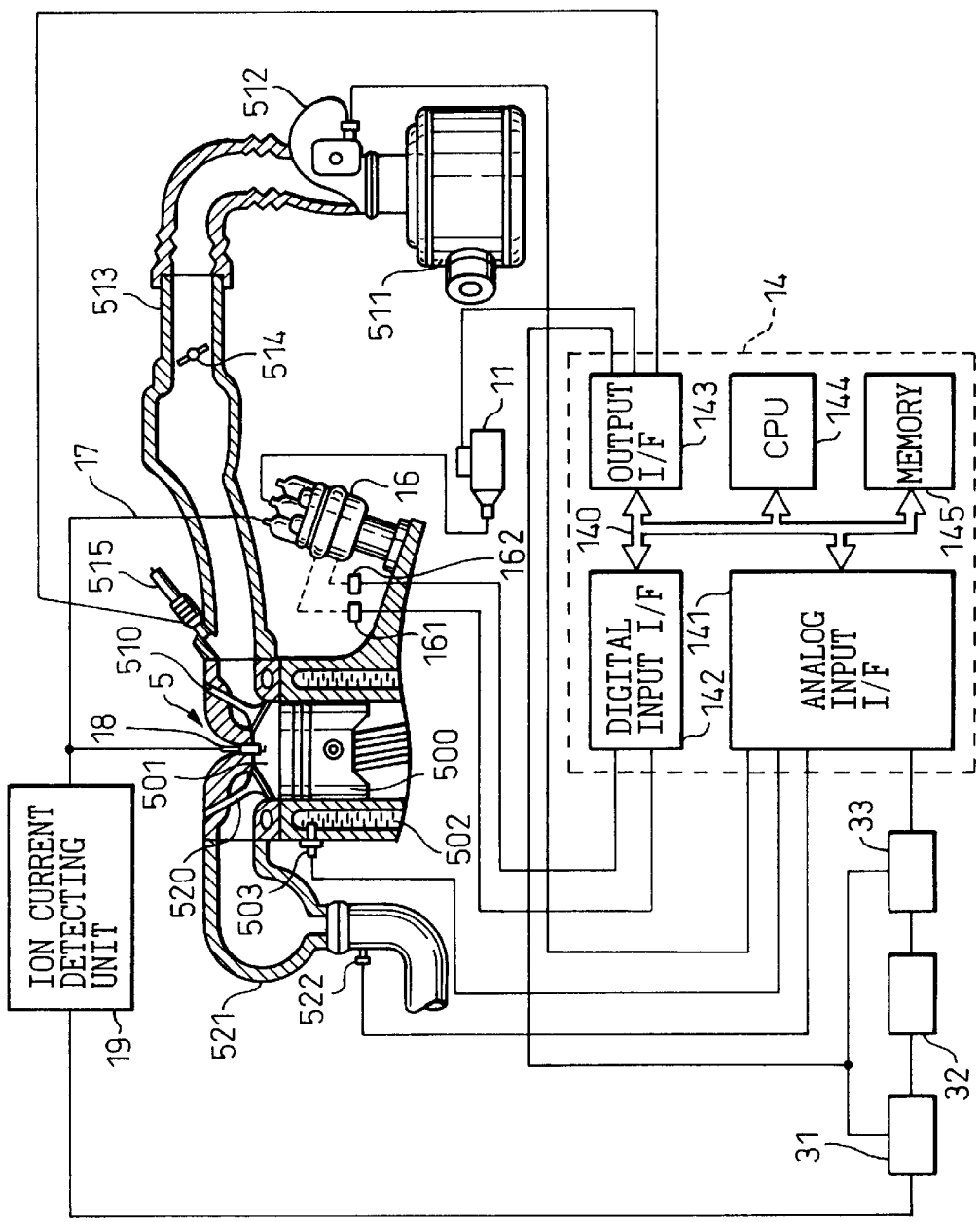
FIG. 5 is a diagram illustrating the constitution of a device for detecting the condition of combustion in an internal combustion engine according to the present invention.

FIG. 5 is a diagram illustrating the constitution of a device for detecting a condition of combustion in an internal combustion engine according to the present invention. Mixture gas of air intaken through an air cleaner 511 and fuel injected from a fuel injection valve 515, is supplied into a combustion chamber 501 defined by a piston 500, an intake valve 510 and an exhaust valve 520 in an internal combustion engine 5.

The amount of the intaken air is measured by an air flow meter 512, and is adjusted by a throttle valve 514 disposed on an intake pipe 513.

The mixture compressed by the piston 500 is ignited by the electric discharge of a spark plug 18 near the top dead center of the piston 500, and is expanded by the combustion to produce a force that pushes down the piston 500.

Exhaust gases generated after combustion are exhausted into an exhaust pipe 521 through the exhaust valve 520, and the oxygen concentration in the exhaust gases is detected by an air-fuel ratio sensor 522 installed in the exhaust pipe 521.

The temperature of the cooling water for cooling the internal combustion engine 5 is detected by a cooling water temperature sensor 503 inserted in a water jacket 502.

The ionic current flowing in the combustion chamber 501 is supplied to the LC resonance masking unit 31 through the spark plug 18 and the ionic current detecting unit 19. The output of the LC resonance masking unit 31 is fed, through the band-pass filter 32 that permits the passage of only those frequency components (6 to 7 KHz) specific to the knocking, to the peak-holding unit 33 that holds a peak value in the output of the band-pass filter 32. It is also allowable to use an integrating unit for integrating the output of the band-pass filter 32, instead of the peak-holding unit 33. The peak-holding unit 33 is connected to the ignition timing control unit 14.

The ignition timing control unit 14 is a microcomputer system which is comprised of an analog input interface (I/F) 141, a digital input I/F 142, an output I/F 143, a CPU 144, a memory 145 and a bus 140.

That is, the output of the peak-holding unit 33 is connected to the analog input I/F 141. The air flow meter 512, cooling water temperature sensor 502 and air-to-fuel ratio sensor 522 are further connected to the analog input I/F 141.

The output I/F 142 outputs a valve opening command to the fuel injection valve 515 and, further, outputs an ignition command signal IGT and an ionic current fetching control signal.

That is, the ignition command signal IGT is boosted at the ignition coil 11, and is sent to the spark plug 18 through the distributor 16 and high-tension cable 17. The distributor 16 contains a crank angle sensor 161 which generates a pulse signal every, for example, 30° CA (crank angle) and a reference angle sensor 162 which generates a pulse signal every, for example, 720° CA. These outputs are received by the ignition timing control unit 14 through the digital input I/F 142 and are used for calculating the engine rotational speed Ne, to control the timings for opening and closing the fuel injection valve 515 and the timing for outputting the ignition command signal IGT.

The ionic current fetching control signal turns the LC resonance masking unit 31 off while LC resonance is occurring, so that the LC resonance wave is not fetched, and permits the peak-holding unit 33 to operate while the knocking window is opened.

It is determined whether or not knocking or misfire has occurred by determining whether or not a peak value held by the peak-holding unit 33 is larger than a reference value determined based upon a background while the knocking window is opened by the ignition control unit 14.

The object of the present invention is to prevent the accuracy for detecting combusting condition from deteriorating after the fuel cut is interrupted because the background has been increased while the fuel has been cut. This object can be accomplished by limiting the background to that generated before the fuel was cut while the fuel is being cut.

There are following three concrete methods to limit the background to that calculated before the fuel was cut.

(1) While the fuel is being cut, the background is not updated but is maintained at that value calculated before the fuel was cut, or is fixed to a predetermined value such as a minimum value of the background.

(2) While the fuel is being cut, the ignition command signal IGT is interrupted, in order to suppress the occurrence of spike noise.

(3) While the fuel is being cut, the output of the ionic current detecting unit 19 is forcibly grounded, so that the output due to the spike noise will not be supplied to the background calculation means.

The three embodiments will now be described.

(1) First Embodiment

Figure 6:
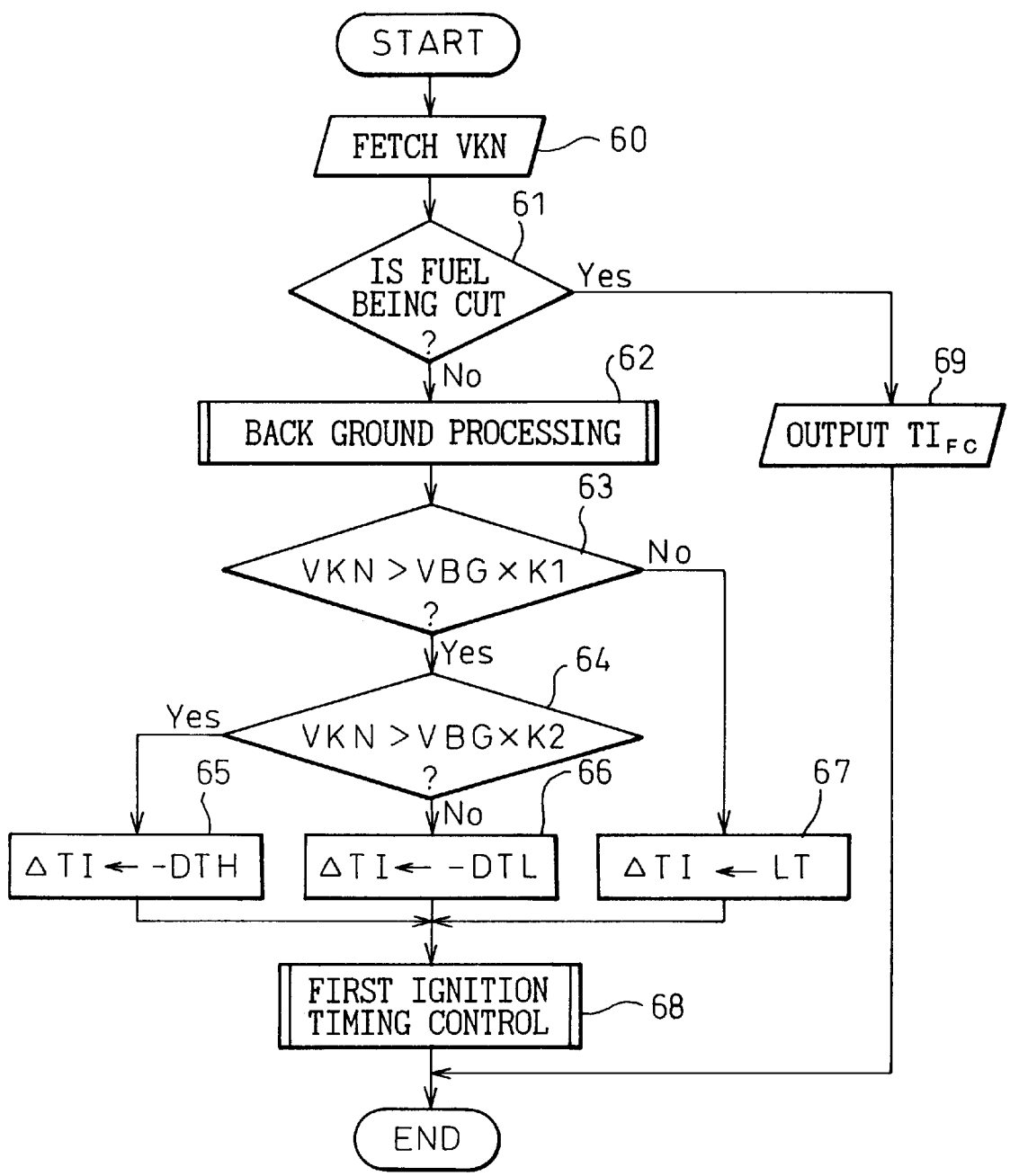
FIG. 6 is a flow chart of a first knocking control routine.

FIG. 6 is a flow chart of a first knocking control routine executed by the CPU 144 in the ignition timing control unit 14 according to a first embodiment. The background is not updated while the fuel is being cut. The routine is executed every ignition timing of each cylinder of the internal combustion engine 5, and variables are determined for each cylinder.

A peak of the ionic current VKN held by the peak-holding unit 33 is fetched at step 60, and it is determined at step 61 whether or not the fuel is being cut.

When the determination at step 61 is negative, i.e., when the fuel is not being cut, the routine proceeds to step 62 where the background VBG calculating subroutine is executed. This subroutine will be described later.

At step 63, it is determined whether or not the peak VKN of the ionic current is larger than a product of a predetermined first coefficient (KI) and the background VBG. When the determination at step 63 is affirmative, i.e., when it is determined that knocking occurs, it is determined at step 64 whether or not the peak VKN of the ionic current is larger than a product of a predetermined second coefficient (K2) and the background VBG, when 0<K1<K2.

When the determination at step 64 is affirmative, that is when the knocking level is high, an ignition timing correcting factor $\Delta TI$ is set to a predetermined large delay angle (−DTH) at step 65, and the routine proceeds to step 68.

When the determination at step 64 is negative, that is, when it is determined that the knocking level is low, the ignition timing correction factor $\Delta TI$ is set to a predetermined small delay angle (−DTL) at a step 66, and the routine proceeds to step 68.

When the determination at step 63 is affirmative, that is, when it is determined that the knocking does not actually occur, the ignition timing correction factor $\Delta TI$ is set to a predetermined advancing angle LT at step 67, and the routine proceeds to step 68.

Here, it is presumed that 0<LT<DTL<DTH. Thus, when no knocking occurs, the ignition timing is gradually advanced and when knocking occurs, the ignition timing is delayed to suppress the knocking. In this embodiment, furthermore, the angle is delayed more when the knocking level is high to enhance the effect of suppression.

A first ignition timing control subroutine is executed at step 68 to terminate the routine. The first ignition timing control subroutine will be described later.

When the determination at step 61 is affirmative, that is, when the fuel is being cut, the routine proceeds to a step 69 where a predetermined fuel-cut ignition timing $TI_{FC}$ is output to terminate the routine.

Figure 7:
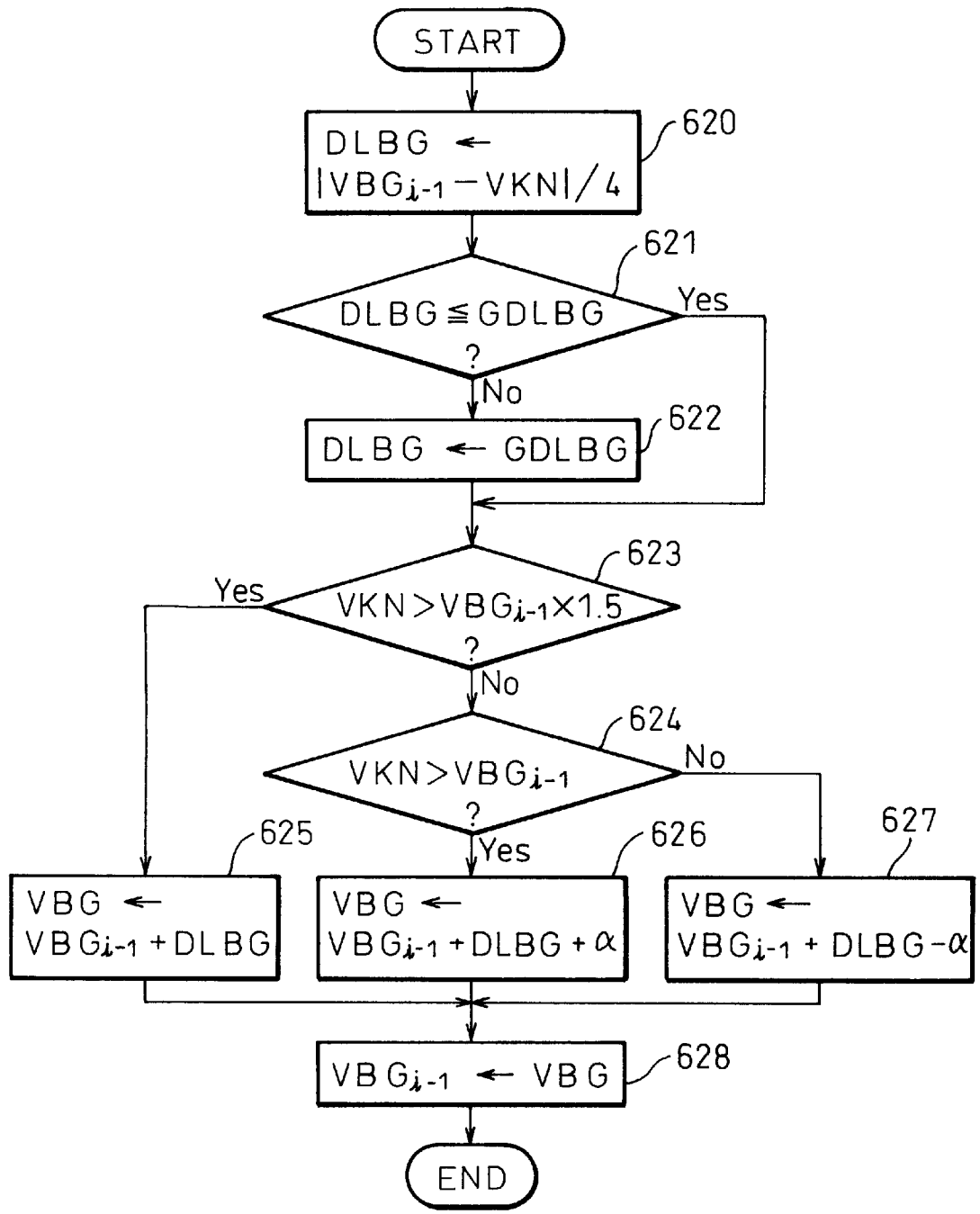
FIG. 7 is a flow chart of a background calculating subroutine.

FIG. 7 is a flow chart of a background calculation subroutine executed at step 62 in the first knocking control routine. An updating amount DLBG is calculated at a step 620 according to the following formula.

$$DLBG \leftarrow |VBG_{i-1} - VKN|/4$$

where $VBG_{i-1}$ is a background calculated in the previous execution, and the updating amount DLBG is calculated as one-fourth of the absolute value of a difference between the background calculated before the previous execution and a peak value VKN of this execution.

At steps 621 and 622, the updating amount DLBG is limited to a predetermined upper-limit guard value GDLBG.

At steps 623 and 624, it is determined whether or not the peak value VKN of this execution is larger than a predetermined coefficient (for example, 1.5) which is larger than $VBG_{i-1} \times 1$, larger than $VBG_{i-1}$ which is smaller than a product of $VBG_{i-1}$ and the predetermined coefficient, or is smaller than $VBG_{i-1}$.

When the peak value VKN is larger than the product of $VBG_{i-1}$ and the predetermined coefficient, the background VBG is updated at step 625 according to the following formula, $$VBG \leftarrow VBG_{i-1} + DLBG$$

When the peak value VKN is smaller than the product of $VBG_{i-1}$ and the predetermined coefficient but is larger than $VBG_{i-1}$, the background VBG is updated at step 626 according to the following formula, $$VBG \leftarrow VBG_{i-1} + DLBG + \alpha$$

When the peak value VKN is smaller than $VBG_{i-1}$, the background VBG is updated at step 627 according to the following formula, $$VBG \leftarrow VBG_{i-1} + DLBG - \alpha$$

where $\alpha$ is an adjustment coefficient for setting the background VBG within a suitable range.

Finally, at step 628, $VBG_{i-1}$ is set to the background VBG calculated in this execution to be ready for the next execution, and the subroutine is terminated.

Figure 8:
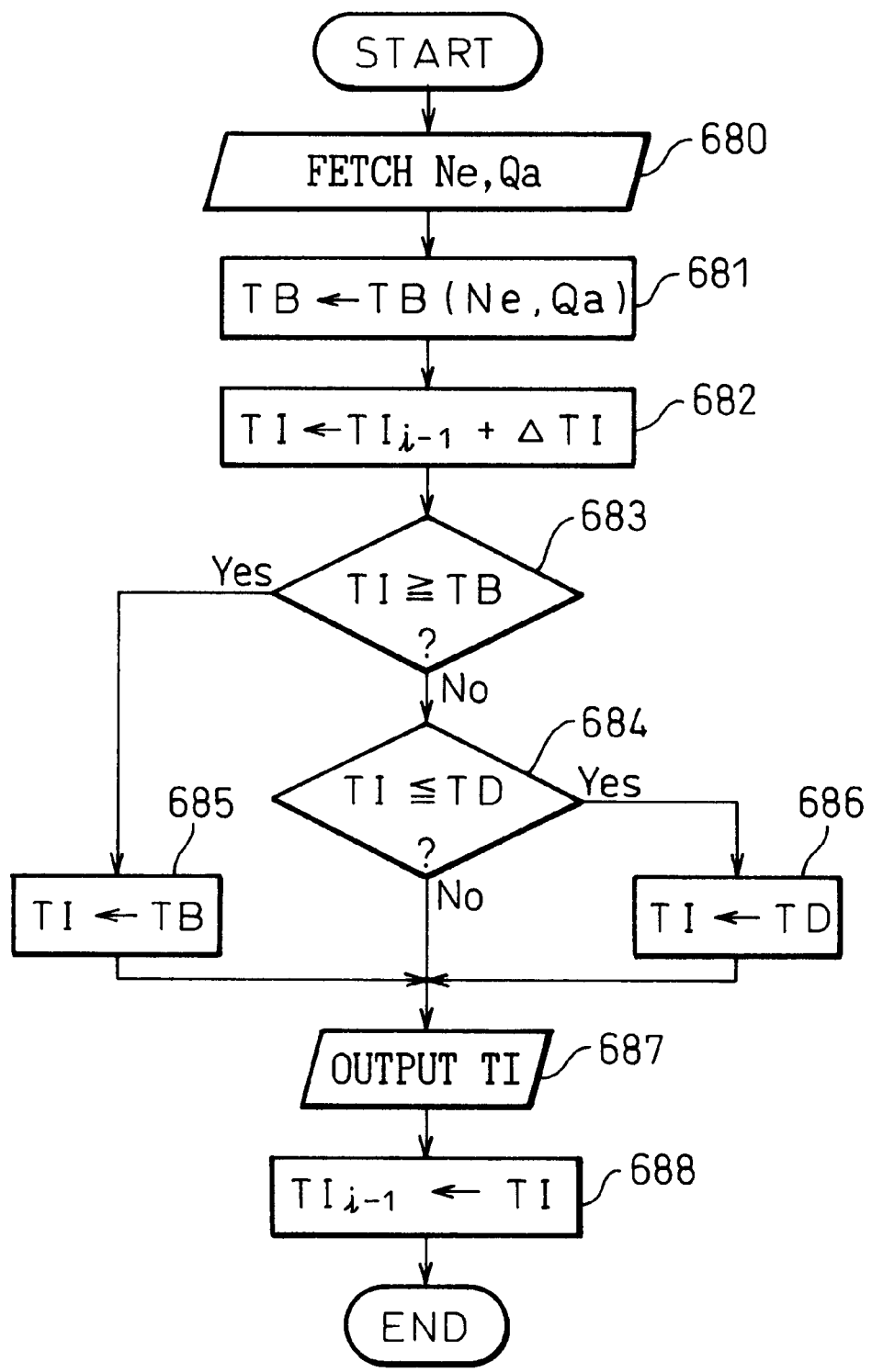
FIG. 8 is a flow chart of a first ignition timing control subroutine.

FIG. 8 is a flow chart of the first ignition timing control subroutine executed at step 68 in the first knocking control routine. The engine speed Ne determined depending upon a pulse output from the crank angle sensor 507 and the intaken air amount Qa detected by the air flow meter 512, are fetched at step 680 and a reference ignition timing TB is calculated at step 681 as a function of the engine speed Ne and the intaken air amount Qa according to the following formula, $$TB \leftarrow TB(Ne, Qa)$$

At step 682, the ignition timing correction factor $\Delta TI$ is added to the ignition timing $TI_{i-1}$, calculated in the previous execution, to calculate the ignition timing TI of this execution, $$TI \leftarrow TI_{i-1} + \Delta TI$$

In this embodiment, the ignition timing is advanced when a positive number is added and is delayed when a positive number is subtracted.

At steps 683 and 684, it is determined whether or not the ignition timing TI of this execution lies between the reference ignition timing TB which is the maximum advanced ignition timing and a predetermined maximum delayed ignition timing TD.

That is, when the ignition timing TI of this execution is more advanced than the reference ignition timing TB, the determination at sep 683 is affirmative, the ignition timing TI of this execution is replaced by the reference ignition timing TB at step 685, and the control proceeds to step 687.

Conversely, when the ignition timing TI of this execution is more delayed than the maximum delayed ignition timing TD, the determination at step 684 is negative, the ignition timing TI of this execution is replaced by the maximum delayed ignition timing TD at step 686, and the routine proceeds to step 687. When the ignition timing TI of this execution lies between the reference ignition timing TB and the maximum delayed ignition timing TD, the control directly proceeds to step 687.

At step 687, the ignition command signal IGT is output to the ignition coil 11 through the output I/F 553, the ignition timing $TI_{i-1}$ calculated in the previous execution is updated to the ignition timing TI of this execution to be ready for the next execution, and this subroutine is terminated.

That is, in the first embodiment, an execution of the background calculating subroutine is halted while the fuel is being cut. The background is held at a value calculated before the fuel was cut when the peak VKN of the ionic current held by the peak-holding unit 33 is increased due to the impulse noise.

Here, when the determination at step 61 is affirmative, another step may be provided to set the background VBG to a minimum background value VBGmin (background when the fuel is being cut and no spike noise is generated). Therefore, the background is maintained at a minimum background while the fuel is being cut.

(2) Second Embodiment

Figure 9:
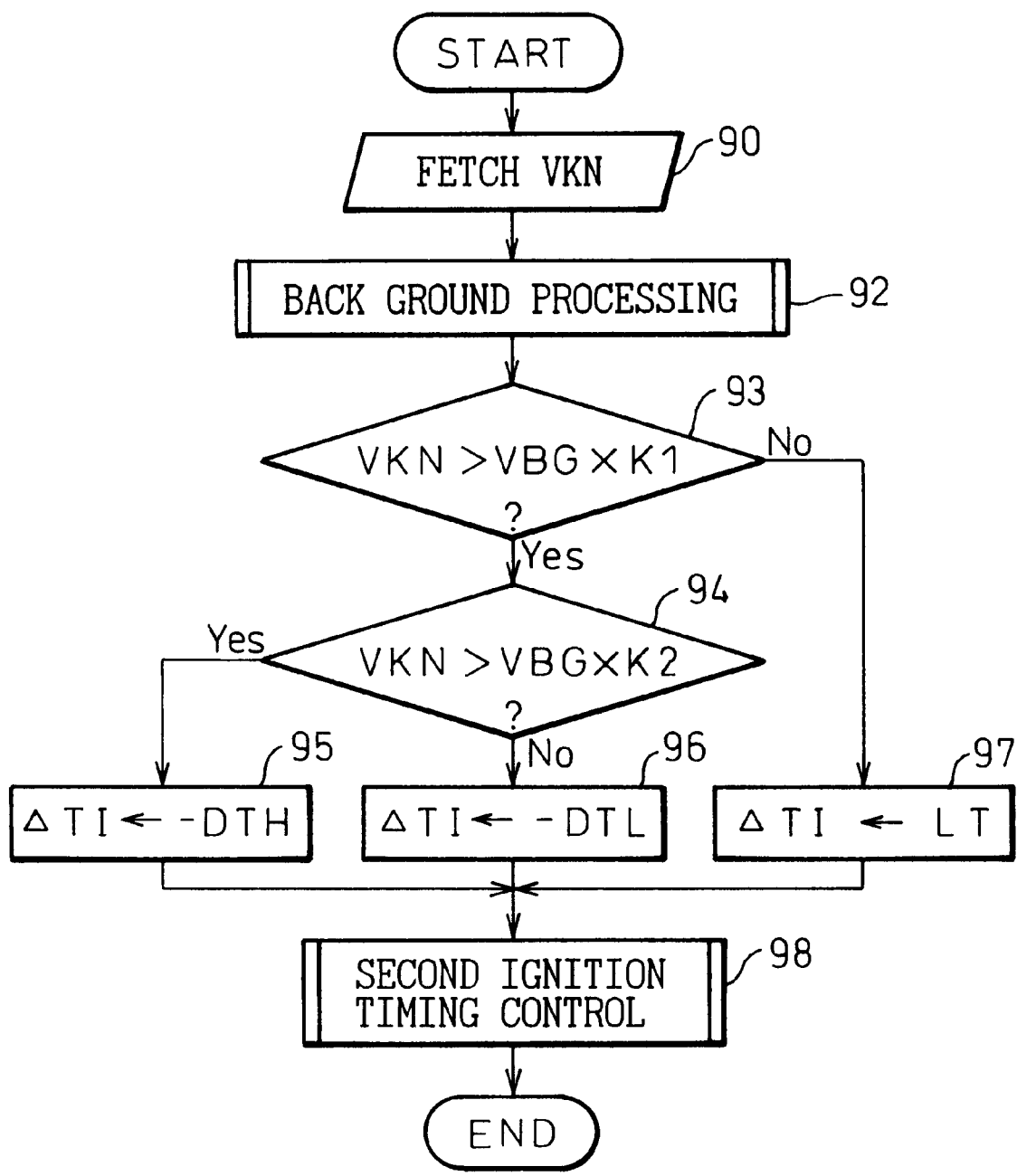
FIG. 9 is a flow chart of a second knocking control routine.

FIG. 9 is a flow chart of a second knocking control routine executed by the CPU 144 in the ignition timing control unit 14 according to a second embodiment, and wherein the ignition command signal is not output while the fuel is being cut. According to the second knocking control routine, the steps 61 and 69 are omitted from the first knocking control subroutine, and the second ignition timing control subroutine is executed instead of the first ignition timing control subroutine That is, at step 90, a peak of the ionic current VKN held by the peak-holding unit 33 is fetched, and the background VBG calculating subroutine is executed at step 92. This subroutine was already explained with reference to FIG. 7.

At step 93, it is determined whether or not the peak of the ionic current VKN is larger than the product of the predetermined first coefficient (K1) and the background VBG. When the determination at step 93, that is, when it is determined that the knocking occurs, it is determined at step 94 whether or not the peak of the ionic current VKN is greater than a product of the predetermined second coefficient (K2) and the background VBG. Where 0<K1<K2.

When the determination at step 94 is affirmative, that is, when the knocking level is high, the ignition timing correction factor ΔTI is set to the large delay angle (−DTH) at step 95, and the control proceeds to step 98.

When the determination at step 94 is negative, that is when it is determined that the knocking level is small, the ignition timing correction factor ΔTI is set to the small delay angle (−DTL) at step 96, and the control proceeds to step 98.

When the determination at step 93 is negative, that is, when it is determined that the knocking is not actually occurring, the ignition timing correction factor ΔTI is set to a predetermined advancing angle LT at step 97, and the control proceeds to step 98.

At step 98, the second ignition timing control subroutine is executed, and the routine is terminated. The second ignition timing control subroutine will be described later.

Figure 10:
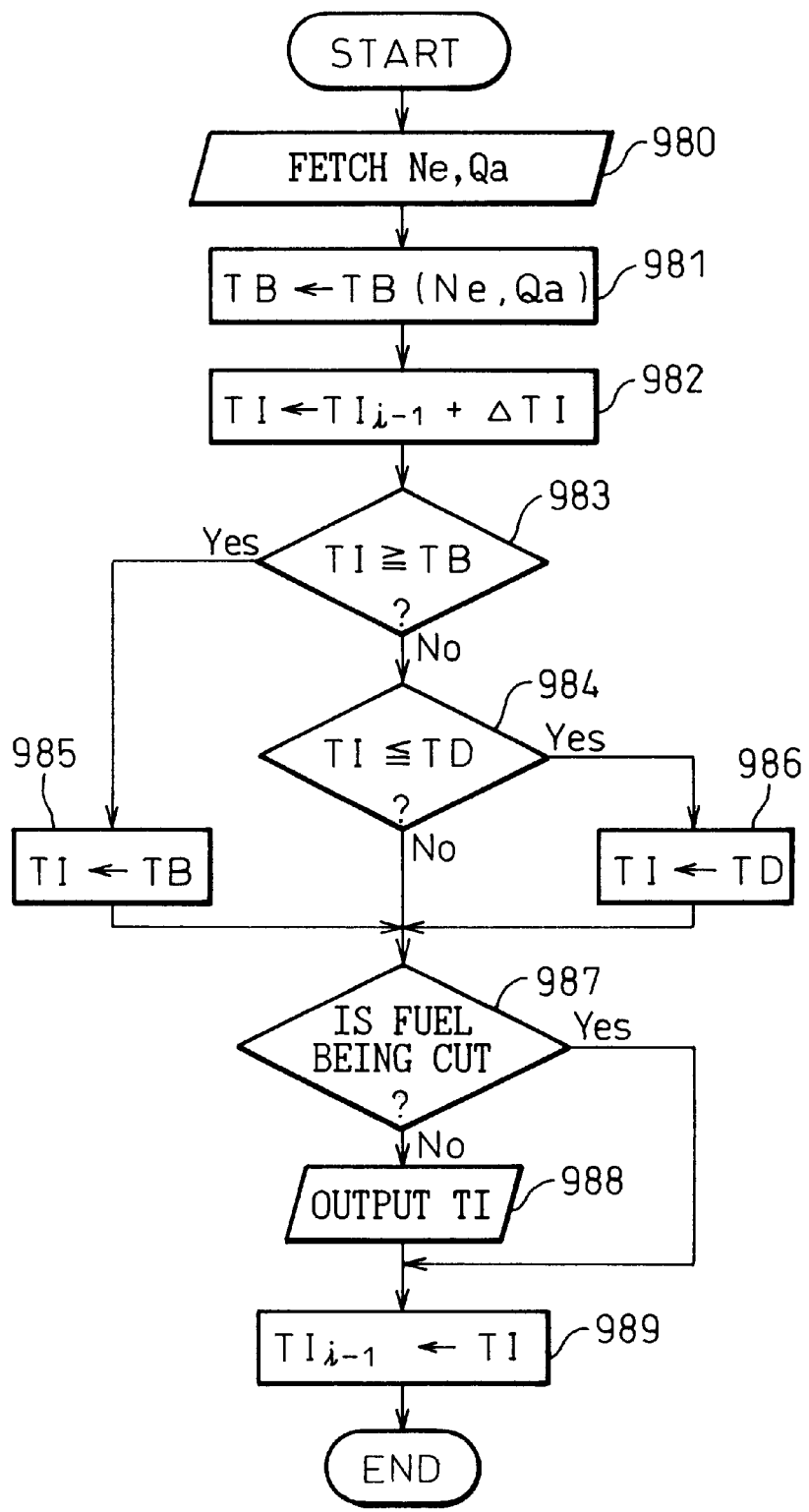
FIG. 10 is a flow chart of a second ignition timing control subroutine.

FIG. 10 is a flow chart of the second ignition timing control subroutine executed at step 98 of the second knocking control routine. The engine speed Ne determined based on pulses output from the crank angle sensor 507 and the intaken air amount Qa detected by the air flow meter 512 are fetched at step 980, and a reference ignition timing TB is calculated at step 981 as a function of the engine speed Ne and the intaken air amount Qa with the following formula, TB←TB (Ne, Qa)

At step 982, the ignition timing correction factor ΔTI is added to the ignition timing $TI_{i-1}$, calculated in the previous excution to calculate the ignition timing TI of this execution.

$TI \leftarrow TI_{i-1} + \Delta TI$

At steps 983 and 984, it is determined whether or not the ignition timing TI of this execution lies between the reference ignition timing TB which is the maximum advanced ignition timing and a predetermined maximum delayed ignition timing TD.

That is, when the ignition timing TI of this execution is more advanced than the reference ignition timing TB, the determination at step 983 is affirmative, the ignition timing TI of this execution is replaced by the reference ignition timing TB at step 985, and the control proceeds to a step 987.

Conversely, when the ignition timing TI of this execution is more delayed than the maximum delayed ignition timing TD, the determination at step 984 is negative, the ignition timing TI of this execution is replaced by the maximum delayed ignition timing TD at step 986, and the control proceeds to step 987. When the ignition timing TI of this execution lies between the reference ignition timing TB and the maximum delayed ignition timing TD, the control directly proceeds to step 987.

At step 987, it is determined whether or not the fuel is being cut. When the fuel is not being cut, the ignition command signal IGT is output at step 988 to the ignition coil 11 through the output I/F 143, and the control proceeds to step 989. When the fuel is being cut, the control directly proceeds to step 989.

At step 989, the ignition timing $TI_{i-1}$ calculated in the previous execution is updated to the ignition timing TI of this execution to be ready for the operation of the next execution, and this routine is terminated.

According to the second embodiment, the ignition command signal is not output while the fuel is being cut, and the occurrence of impulse noise is suppressed. According to the second embodiment, therefore, the background is updated while the fuel is being cut. However, since no impulse noise is generated, the peak VKN of the ionic current is "0", the background gradually decreases while the fuel is being cut and is limited to a value calculated before the fuel was cut.

(3) Third Embodiment

Figure 1:
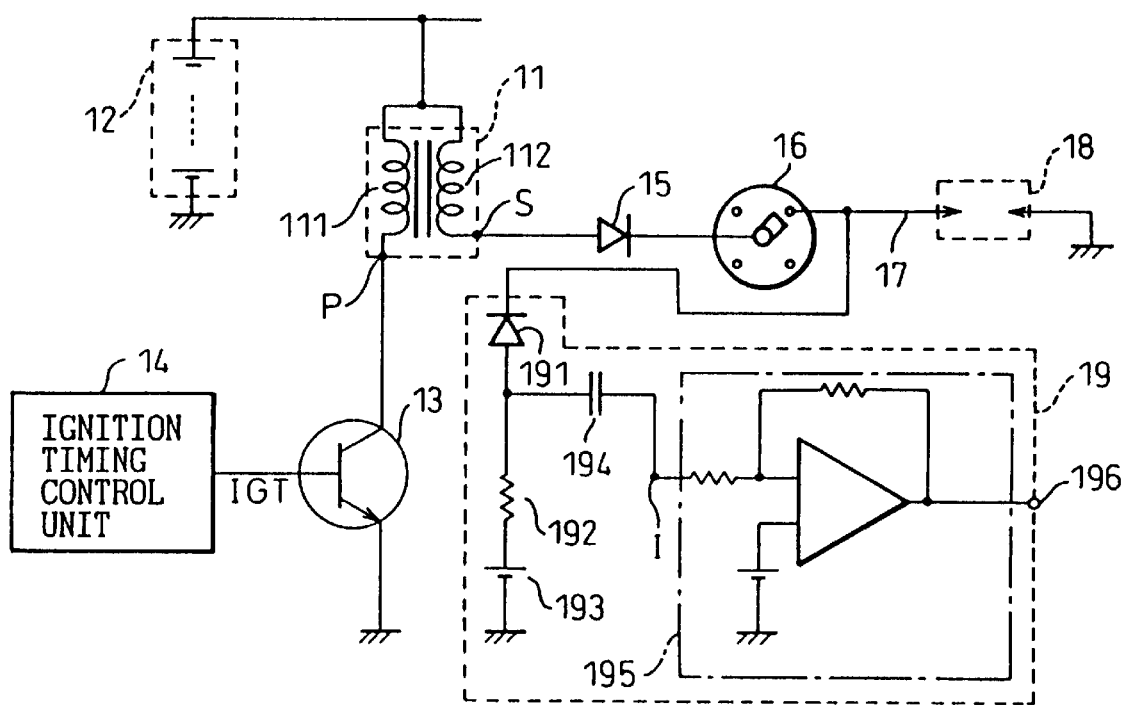
FIG. 1 is a diagram schematically illustrating an ignition circuit for an internal combustion engine.
Figure 2:
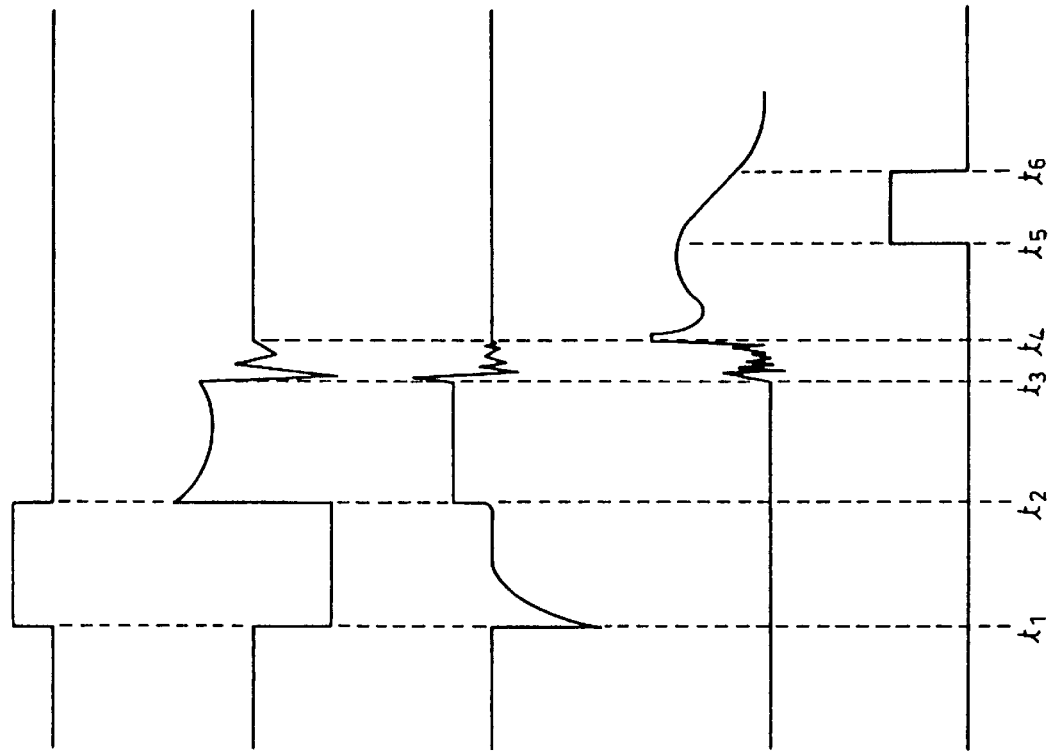
FIGS. 2A to 2E are diagrams of voltage waveforms the ignition circuit.
Figure 3:
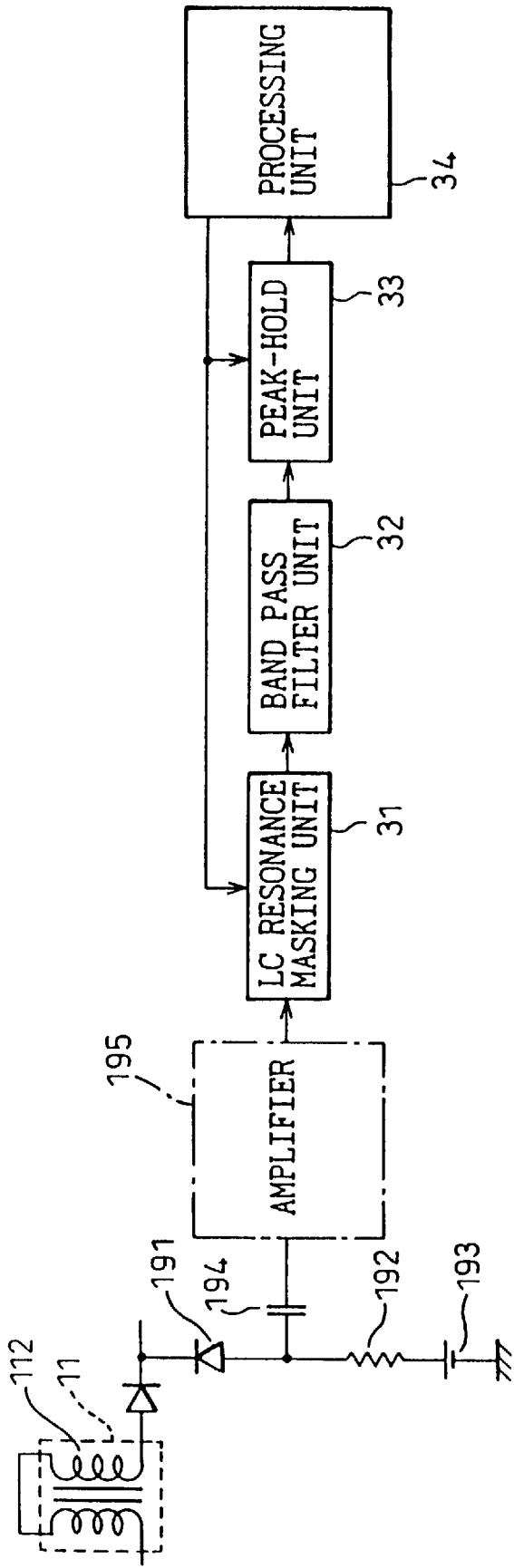
FIG. 3 is a diagram illustrating the constitution of a device for detecting knocking using the ionic current.
Figure 4:
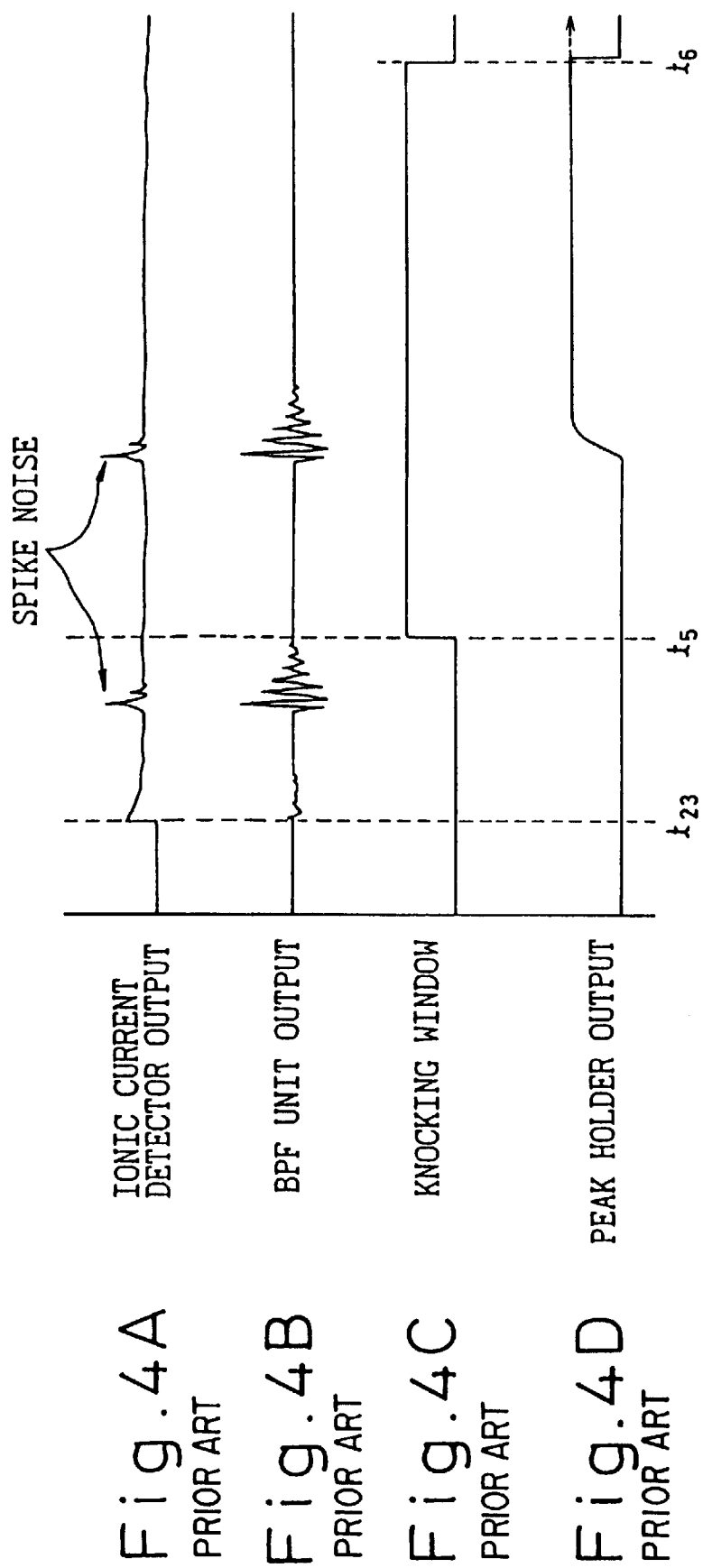
FIGS. 4A to 4D are diagrams illustrating the effect of spike noise.
Figure 11:
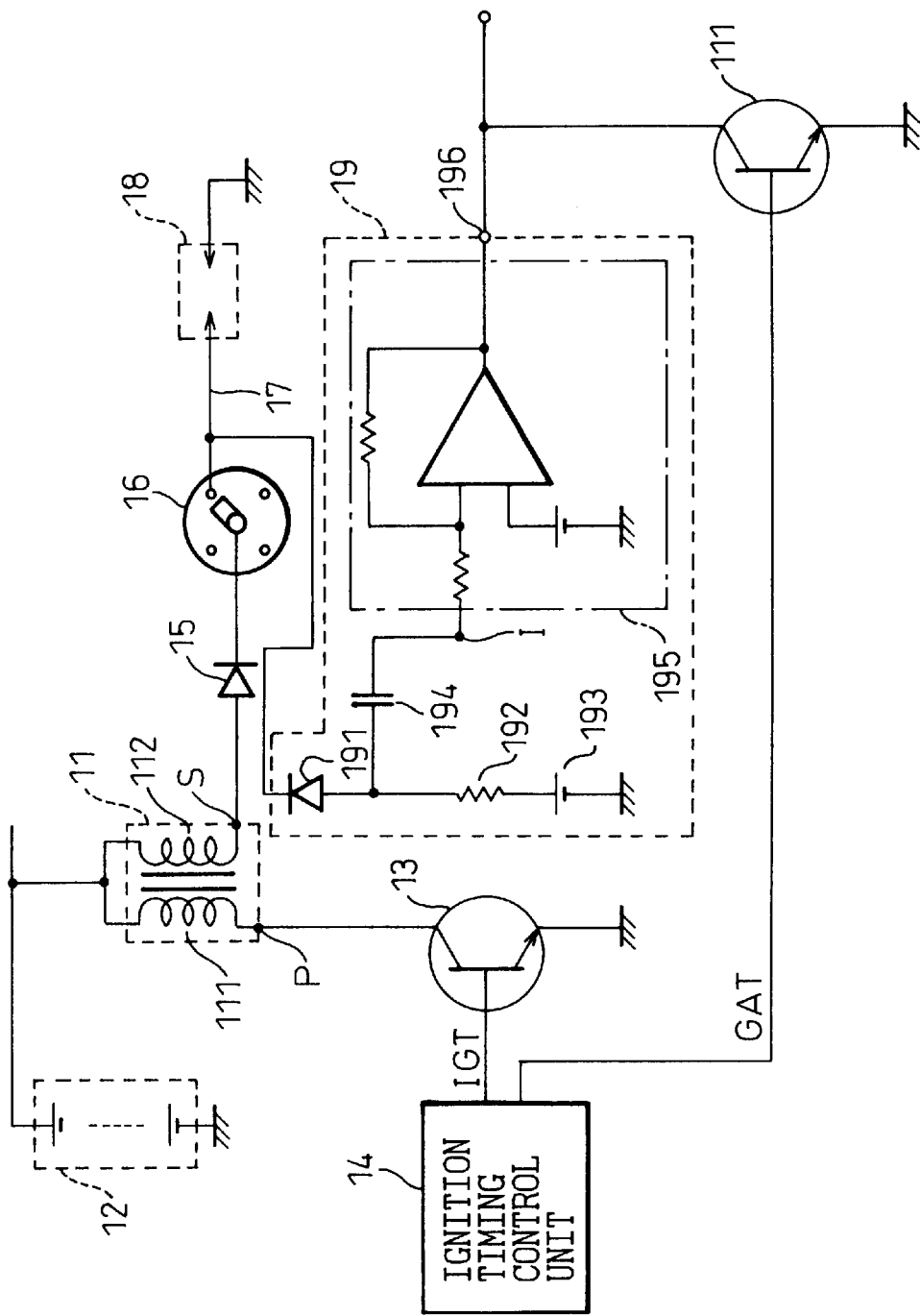
FIG. 11 is a diagram of an ignition circuit used in a third embodiment.

FIG. 11 illustrates an ignition circuit used in the third embodiment and in which a transistor 111 is added to the output of the ionic current detecting unit 19 of FIG. 1.

That is, the collector of the transistor 111 is connected to the output terminal 196 of the ionic current detecting unit 19, the base thereof is connected to the ignition timing control unit 14, and the emitter thereof is grounded. The transistor 111 is turned on and off by a gate control signal GAT output from the ignition timing control unit 14. When the gate control signal GAT is for opening the gate, the transistor 111 is cut off and the output of the ionic current detecting unit 19 is directly supplied to the LC resonance masking unit 31. When the gate control signal GAT is for closing the gate, the transistor 111 is turned on, and the input to the LC resonance masking unit 31 is maintained at "0".

Figure 12:
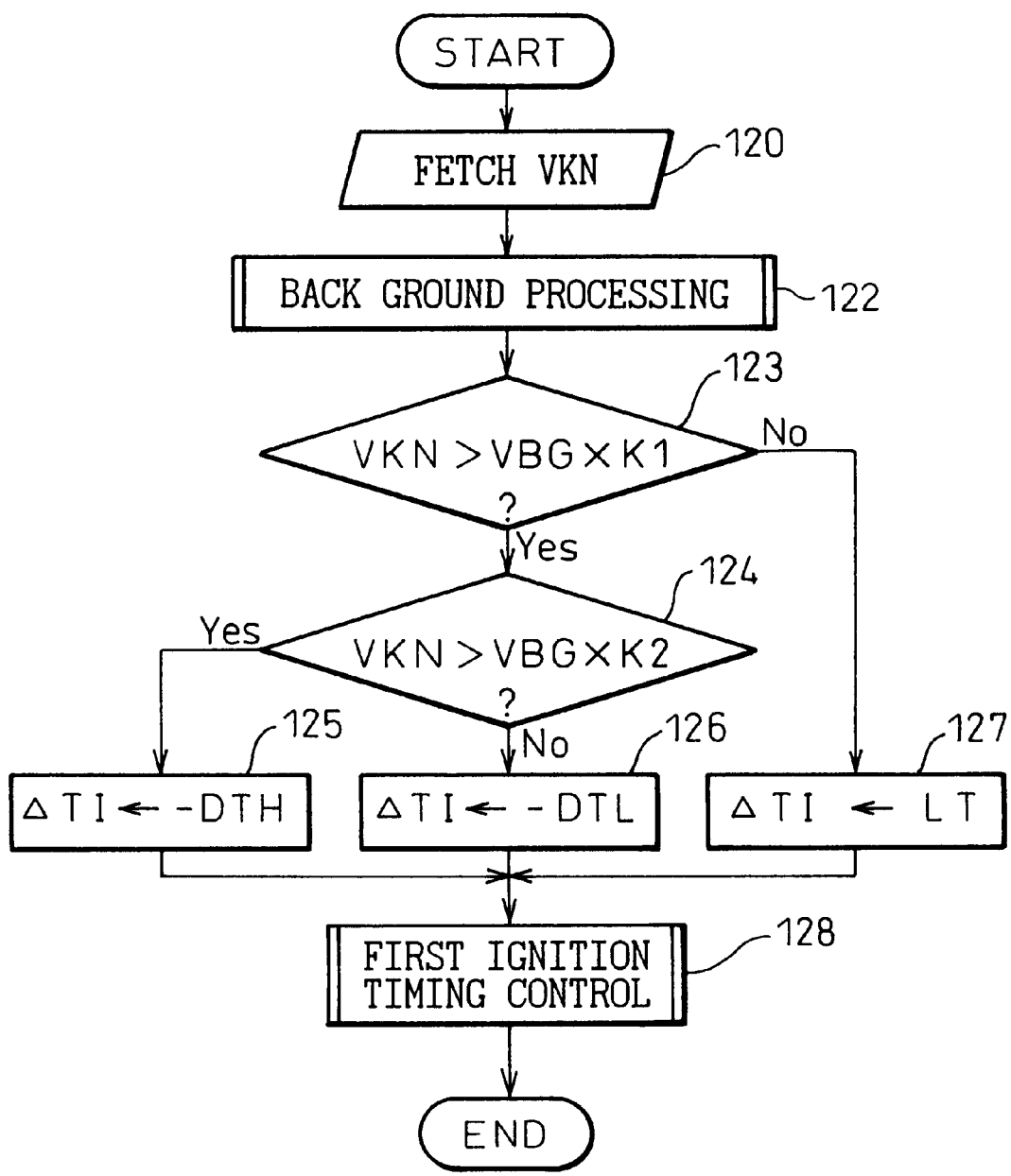
FIG. 12 is a flow chart of a third knocking control routine.

FIG. 12 illustrates a third knocking control routine used in the third embodiment, and in which the steps 61 and 69 are omitted from the first knocking control routine.

That is, at step 120, a peak of the ionic current VKN held by the peak-holding unit 33 is fetched, and the background VBG calculation subroutine is executed at a step 122. This subroutine was already explained with reference to FIG. 7.

At a step 123, it is determined whether or not the peak of the ionic current VKN is larger than the product of a predetermined first coefficient (K1) and the background VBG. When the determination at step 123 is affirmative, that is, when it is determined that the knocking is occurring, it is determined at step 124 whether or not the peak of the ionic current VKN is greater than a product of the predetermined second coefficient (K2) and the background VBG. It is here presumed that 0<K1<K2.

When the determination at step 124 is affirmative, that is when the knocking level is high, the ignition timing correction factor ΔTI is set to a large delay angle (−DTH) at step 125, and the control proceeds to a step 128.

When the determination at step 124 is negative, that is when it is determined that the knocking level is low, the ignition timing correction factor ΔTI is set to a small delay angle (−DTL) at step 126, and the control proceeds to step 128.

When the determination at step 123 is negative, that is when it is determined that the knocking is not actually occurring, the ignition timing correction factor ΔTI is set to a predetermined advancing angle LT at step 127, and the control proceeds to the step 128.

At step 128, the first ignition timing control subroutine is executed, and this routine is terminated. The first ignition timing control subroutine is already explained with reference to FIG. 8.

Figure 13:
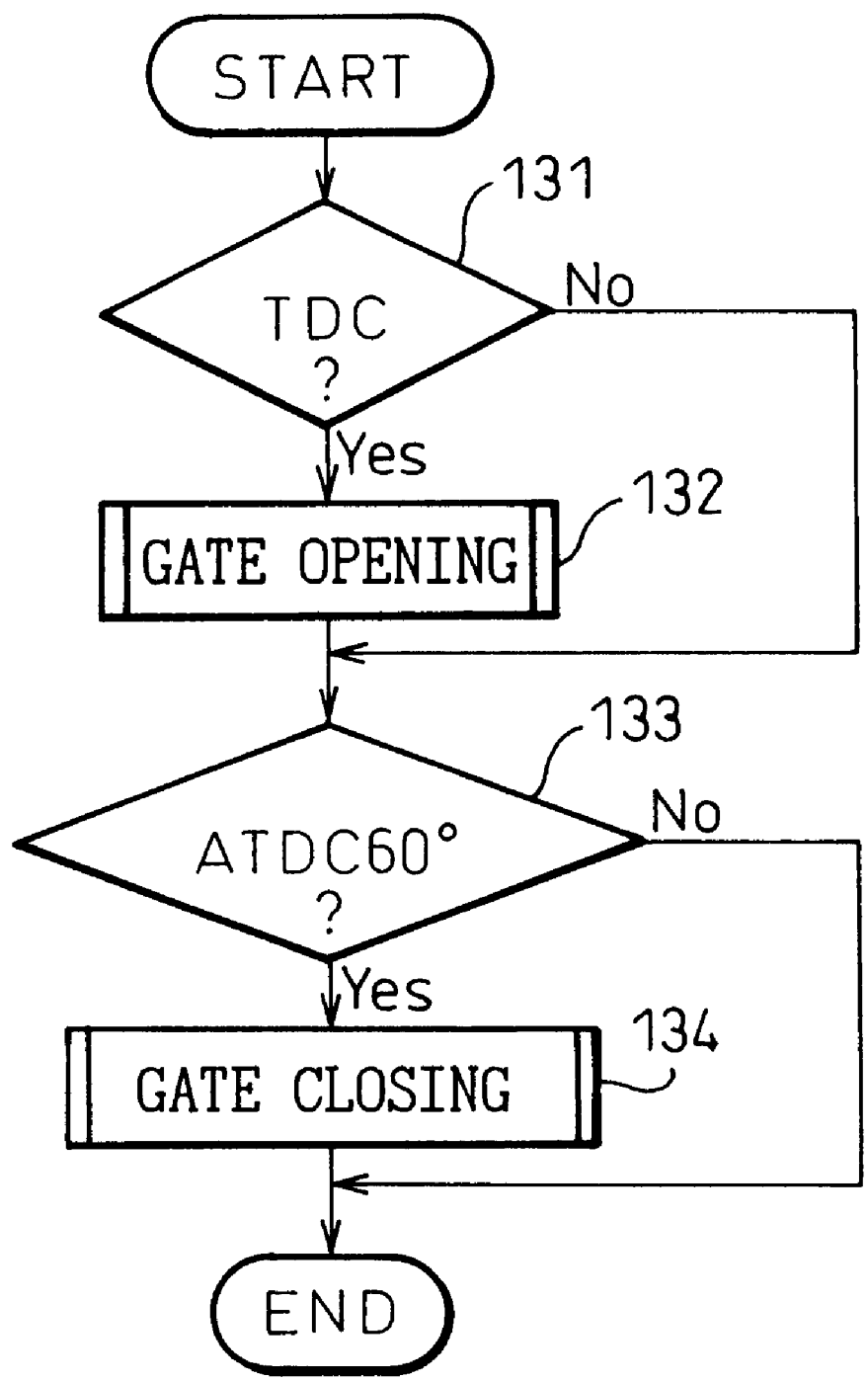
FIG. 13 is a flow chart of a gate control routine.

FIG. 13 is a flow chart of the gate control routine executed in the ignition timing control unit 14 every time when a pulse is output from the crank angle sensor 161, e.g., every 30° CA for each cylinder according to the third embodiment.

At step 131, it is determined whether or not the piston is at TDC (top dead center). When the piston is at TDC, a gate opening subroutine is executed at step 132, and the proceeds to step 133. When the piston is not at TDC on the other hand, the control directly proceeds to the step 133.

At step 133, it is determined whether or not the piston is at ATDC (after top dead center) 60°. When it is at ATDC 60°, a gate closing subroutine is executed to end the routine. When it is not at ATDC 60°, this routine is directly terminated.

Figure 14:
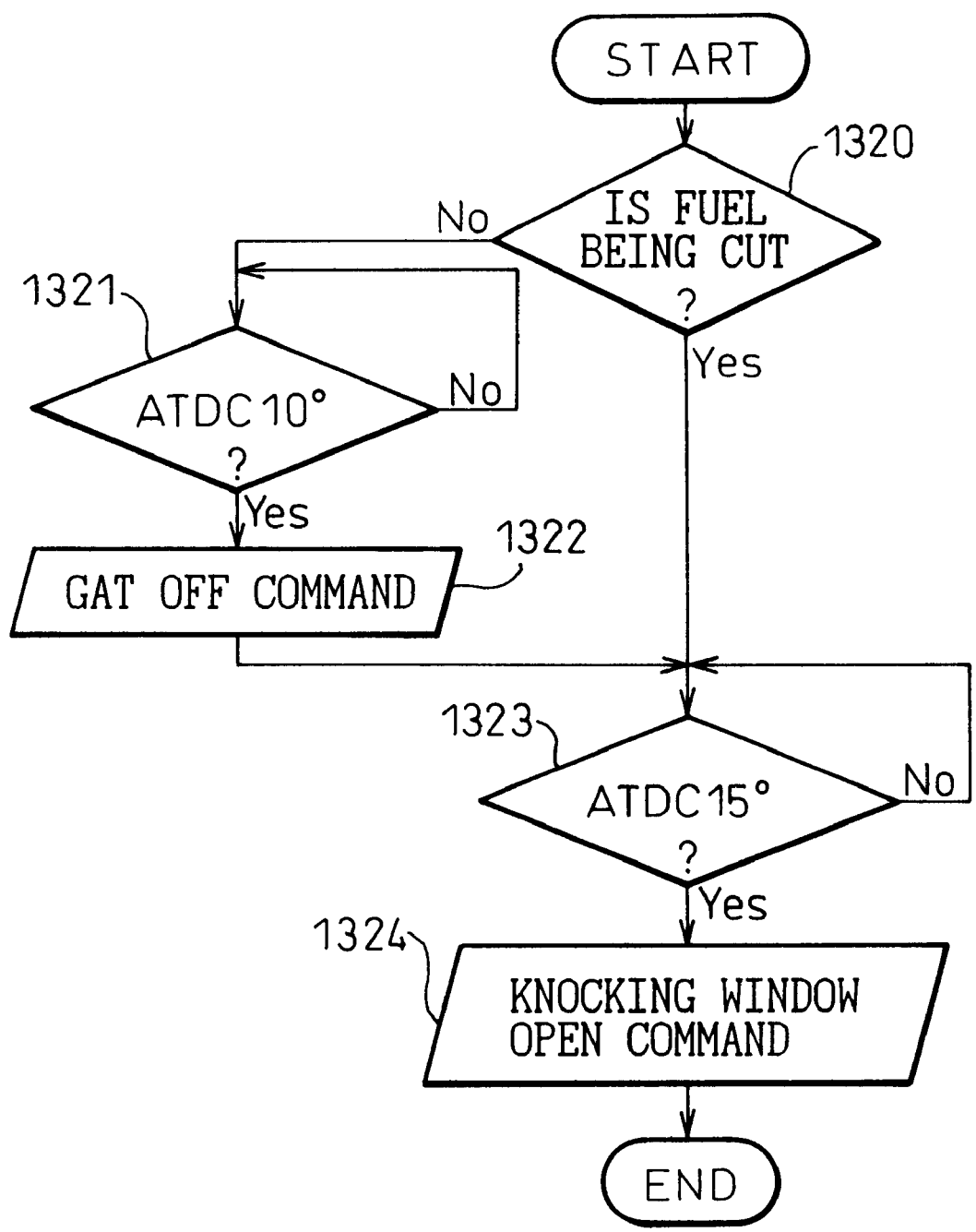
FIG. 14 is a flow chart of a gate opening subroutine.

FIG. 14 is a flow chart of the gate opening subroutine executed at step 132 of the gate control routine. It is determined at step 1320 whether or not the fuel is being cut.

When the determination at step 1320 is negative, that is, when the fuel is not being cut, the control proceeds to step 1321 to wait till the piston reaches ATDC 10°. When the piston reaches ATDC 10°, the gate control signal GAT is set to off at step 1322, and the control proceeds to step 1323.

When the determination at step 1320 is negative, that is, when the fuel is being cut, the gate control signal GAT is not set to off and the control directly proceeds to step 1323.

At step 1323, the control waits till the piston reaches ATDC 15°. When the piston reaches ATDC 15°, the knocking window is opened at step 1324, and this subroutine is terminated.

Figure 15:
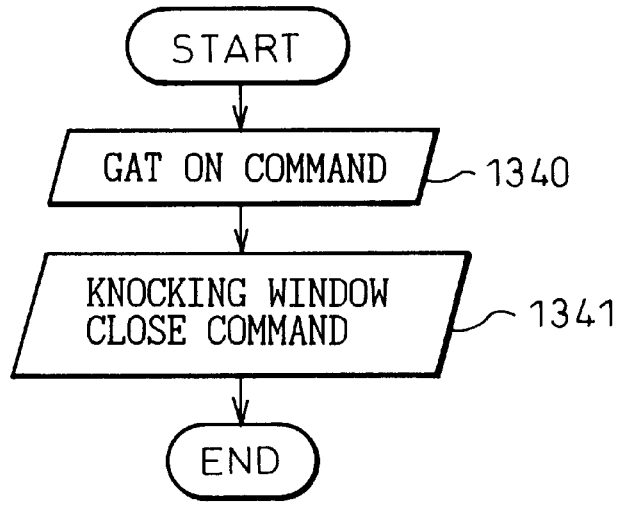
FIG. 15 is a flow chart of a gate closing subroutine.

FIG. 15 is a flow chart of the gate closing subroutine executed at step 134 of the gate control routine. At step 1340, the gate control signal GAT is set to on, and the knocking window is closed at step 1341 to terminate this subroutine.

When executing the above-mentioned gate control routine, when the fuel is not being cut, the transistor 111 is turned off at ATDC 10° and is turned on at the timing ATDC 60°, and the output of the ionic current detecting unit 19 is supplied to the LC resonance masking unit 31 from ATDC 10° to ATDC 60°. When the fuel is being cut, however, the transistor 111 is continuously turned on, whereby the output of the ionic current detecting unit 19 is forcibly grounded, and the input to the LC resonance masking unit 31 becomes "0".

The knocking window remains opened between ATDC 15° and ATDC 60° and does not depend on whether or not the fuel is being cut.

That is, in the third embodiment, the output of the ionic current detecting unit is forcibly set to be "0" while the fuel is being cut, and the impulse noise is not taken in by the ignition timing control unit. Accordingly, though the background is continuously updated even when the fuel is being cut, the background gradually decreases because the output of the ionic current detecting unit is "0". While the fuel is being cut, the calculated background is limited to a value set before the fuel was cut.

In the above-mentioned three embodiments, the background was set to be a moving average of peak values of the ionic currents, which, however, may be a variance or a median of peaks of the ionic currents.

Figure 16:
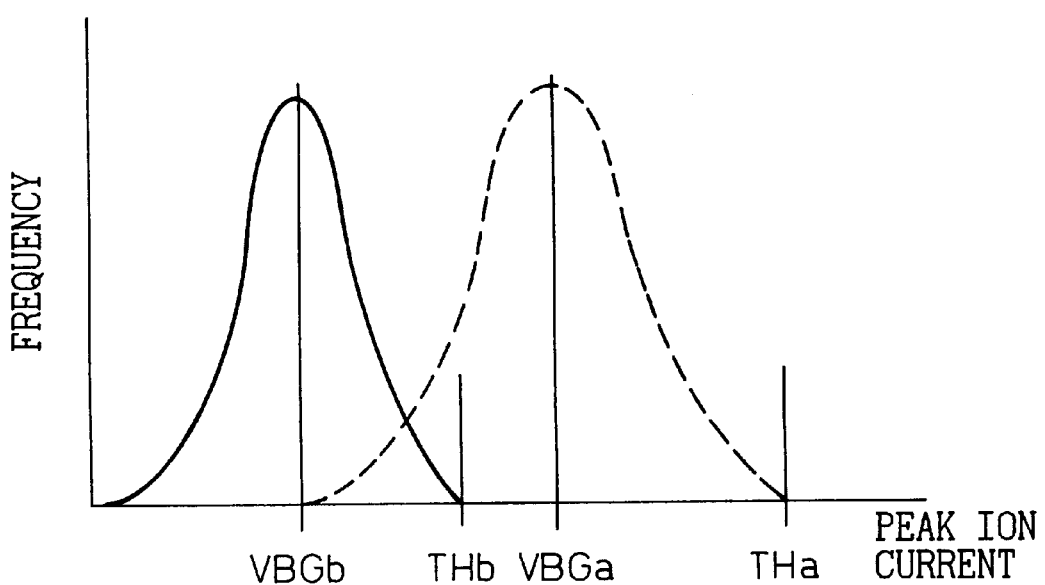
FIG. 16 is a diagram illustrating the effect of the present invention.

FIG. 16 is a diagram explaining the effect of the present invention, wherein the abscissa represents a peak value of the ionic current PNK and the ordinate represents the frequency of occurrence.

A solid line represents a distribution of peak values of ionic current PNK before the fuel was cut, and a broken line represents a distribution of peak values of ionic current PNK after the fuel was cut when the present invention is not applied.

That is, when the present invention is not applied, the average value of ionic current is $VBG_b$ and the discrimination value is $VBG_b \times K1 = TH_b$ before the fuel was cut. But after the fuel was cut, the average value of ionic current increases to $VBG_a$ and the discrimination value increases to $VBG_a \times K1 = TH_a$ due to the spike noise, and the detecting precision is deteriorated.

Conversely, when the present invention is applied, while the fuel is being cut, the background does not become greater than a value calculated before the fuel was cut, and the detecting precision is not deteriorated.

We claim:

1. A device for detecting a state of combustion in an internal combustion engine comprising:

ionic current detection means which applies a voltage across a pair of electrodes installed in a combustion chamber of the internal combustion engine and detects an ionic current flowing between the pair of electrodes through ions generated when mixture gas in the combustion chamber is burned;

means for calculating a background value based upon the ionic current detected by the ionic current detection means;

means for detecting a combusting state in the cylinder of the internal combustion engine by comparing the ionic current with a reference value, wherein the reference value is determined based upon a current value of the background value; and a limiting means which, when the internal combustion engine is operating in a fuel cut mode, limits the current value to a previously calculated value of the background value calculated before the internal combustion engine entered the fuel cut mode.

2. A device according to claim 1, wherein, while the engine is operating in the fuel cut mode, the limiting means sets the background value to a predetermined value.

3. A device according to claim 1, wherein, while the engine is operating in the fuel cut mode, the limiting means interrupts the calculation of the background value by the background calculating means.

4. A device according to claim 1, wherein the engine further comprises an ignition timing control unit which outputs ignition signals and wherein, while the engine is operating in the fuel cut mode, the limiting means inhibits the output of ignition signals from the ignition timing control unit.

5. A device according to claim 1, wherein, while the engine is operating in the fuel cut mode, the limiting means inhibits the detection of ionic current by the ionic current detection means.

6. A device according to claim 1, wherein the background value calculation means calculates the background value based on at least one of a moving average value, a variance and a median of peak values of ionic currents.

7. A method for detecting a state of combustion in an internal combustion engine including means for detecting an ionic current flowing between a pair of electrodes installed in a combustion chamber of the engine, wherein the ionic current is produced by ions generated when mixture gas is burned in the combustion chamber by applying a voltage across the pair of electrodes, comprising the steps of;

calculating a background value based upon the ionic current detected by the ionic current detecting means;

detecting a combusting state in the cylinder by comparing the detected ionic current with a reference value, wherein the reference value is determined based upon the calculated background value; and limiting, when the internal combustion engine is operating in a fuel cut mode, the background value to a previously calculated value of the background value calculated before the internal combustion engine entered the fuel cut mode.

8. A method according to claim 7, wherein, while the engine is operating in the fuel cut mode, the limiting step sets the background value to a predetermined value.

9. A method according to claim 7, wherein, while the engine is operating in the fuel cut mode, the limiting step interrupts the calculation of the background value at the background calculating step.

10. A method according to claim 7, wherein the engine further comprises an ignition timing control unit which outputs ignition signals and wherein, while the engine is operating in the fuel cut mode, the limiting step inhibits the output of ignition signals from the ignition timing control unit.

11. A method according to claim 7, wherein, while the engine is operating in the fuel cut mode, the limiting step inhibits the detection of ionic current by the ionic current detection means.

12. A method according to claim 7, wherein the background value calculating step calculates the background value based on at least one of a moving average value, a variance and a median of peak values of ionic currents.

13. A device for detecting a state of combustion in an internal combustion engine comprising:

an ionic current detection unit which applies a voltage across a pair of electrodes installed in a combustion chamber of the engine and detects an ionic current flowing between the pair of electrodes through ions generated when mixture gas is burned in the combustion chamber;

means for calculating a noise value based upon the ionic current detected by the ionic current detection unit wherein, when the engine is operating in a fuel cut mode, the noise calculating means retains as a maximum noise value a previously calculated value of the noise value calculated prior to the initiation of the fuel cut mode; and means for detecting a state of combustion in the cylinder by comparing the ionic current with a reference value, wherein the reference value is determined based upon a current value of the noise value.

* * * * *